United States Patent
Kim et al.

(10) Patent No.: US 12,009,113 B2
(45) Date of Patent: Jun. 11, 2024

(54) DEVICE FOR SUPPLEMENTING STRUCTURAL INTEGRITY OF SPENT NUCLEAR FUEL ASSEMBLY DURING HANDLING

(71) Applicant: KEPCO NUCLEAR FUEL CO., LTD., Daejeon (KR)

(72) Inventors: Hyeong Koo Kim, Daejeon (KR); Gyu Cheol Shin, Daejeon (KR); Dong Geun Ha, Daejeon (KR); Jae Jun Lee, Daejeon (KR); Seong Ki Lee, Daejeon (KR); Jang Hwan Lim, Daejeon (KR); Jong Sung Yoo, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 377 days.

(21) Appl. No.: 17/421,183

(22) PCT Filed: Feb. 21, 2019

(86) PCT No.: PCT/KR2019/002110
§ 371 (c)(1),
(2) Date: Jul. 7, 2021

(87) PCT Pub. No.: WO2020/149444
PCT Pub. Date: Jul. 23, 2020

(65) Prior Publication Data
US 2022/0059248 A1  Feb. 24, 2022

(30) Foreign Application Priority Data

Jan. 16, 2019  (KR) .................. 10-2019-0005512

(51) Int. Cl.
*G21C 19/20* (2006.01)
*G21C 19/10* (2006.01)
*G21C 19/19* (2006.01)

(52) U.S. Cl.
CPC ............. *G21C 19/20* (2013.01); *G21C 19/10* (2013.01); *G21C 19/19* (2013.01)

(58) Field of Classification Search
CPC ........ G21C 19/10; G21C 19/20; G21C 19/19; G21C 19/00
(Continued)

(56) References Cited

U.S. PATENT DOCUMENTS

| 4,416,848 A | 11/1983 | Feutrel |
| 6,356,614 B1 | 3/2002 | Allen et al. |

(Continued)

FOREIGN PATENT DOCUMENTS

| DE | 19520130 A1 | 12/1996 |
| EP | 0218932 A2 | 4/1987 |

(Continued)

OTHER PUBLICATIONS

Extended European Search Report, dated Aug. 23, 2022.

*Primary Examiner* — Jack W Keith
*Assistant Examiner* — Daniel Wasil
(74) *Attorney, Agent, or Firm* — Klintworth & Rozenblat IP LLP (57) ABSTRACT

A device for supplementing structural integrity of a spent nuclear fuel assembly during handling is provided. The spent nuclear fuel assembly includes spacer grids for supporting fuel rods, guide tubes, and top and bottom nozzles for supporting upper and lower ends of the guide tubes. The device includes a housing, a rod member and fixing members. The housing includes a plurality of free end portions, stopper protrusions formed at an end of each of the free end portions, a first male thread formed on an outer surface, and a female thread formed on an inner surface. The rod member includes a pressurization protrusion at one end and a second male thread for engaging with the female thread of the (Continued)

housing. The fixing members are configured engage with the first male thread to secure the device to the top nozzle of the spent nuclear fuel assembly.

8 Claims, 7 Drawing Sheets

(58) Field of Classification Search
USPC .................................................. 376/264, 271
See application file for complete search history.

(56) References Cited

U.S. PATENT DOCUMENTS

2009/0257545 A1    10/2009  Savinell et al.
2016/0232992 A1*   8/2016   Park ..................... G21C 3/3315

FOREIGN PATENT DOCUMENTS

| JP | H11142567 A | 5/1999 |
| JP | 2018-048539 A | 3/2018 |
| KR | 200368168 Y1 | 11/2004 |
| KR | 20080030978 A | 4/2008 |
| KR | 20110009454 U | 10/2011 |

* cited by examiner

DEVICE FOR SUPPLEMENTING STRUCTURAL INTEGRITY OF SPENT NUCLEAR FUEL ASSEMBLY DURING HANDLING

This is a National Stage Application of International Patent Application No. PCT/KR2019/002110, filed Feb. 21, 2019, which claims the benefit of and priority to Korean Application No. 10-2019-0005512, filed Jan. 16, 2019, the entireties of which are incorporated fully herein by reference.

TECHNICAL FIELD

The present disclosure relates to a fixing device for use to handle a spent nuclear fuel assembly and a method for installing the same, wherein guide tubes and a top nozzle of the spent nuclear fuel assembly may be fixed to each other, thereby improving structural reliability.

BACKGROUND ART

Nuclear fuel used in a nuclear reactor is manufactured by charging a plurality of pellets into a fuel rod after enriched uranium is formed into cylindrical pellets of a regular size. In this case, a plurality of the fuel rods constitutes a nuclear fuel assembly and is loaded into the core of the nuclear reactor, whereby burnup takes place through a nuclear reaction.

Figure 1:
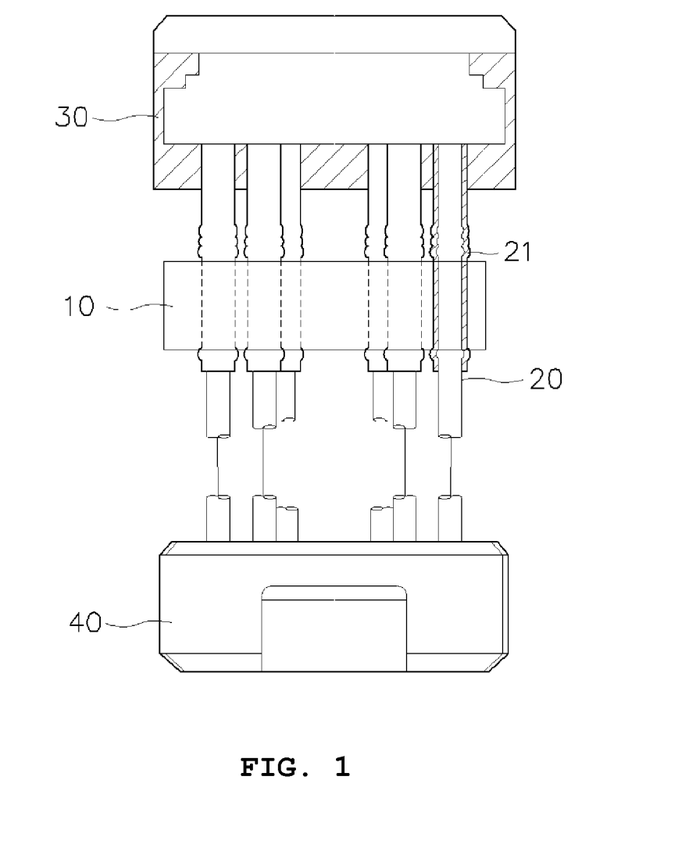
FIG. 1 is a schematic configuration diagram of a nuclear fuel assembly.

With reference to FIG. 1, a nuclear fuel assembly includes a plurality of spacer grids 10 to support in a transverse direction a plurality of fuel rods arranged in an axial direction, a plurality of guide tubes 20 fixed to the spacer grid 10 to form a skeleton of the assembly, and a top nozzle 30 and a bottom nozzle 40 to support the upper and lower ends of the guide tubes 20, respectively.

The guide tubes 20 are fixed to the spacer grids 10 to restrict the movement of the spacer grids 10. In this case, the spacer grids 10 and the guide tubes 20 may be welded directly or by the mediation of sleeves or may be fastened to each other using local plastic deformation by bulging the guide tubes and the sleeves.

The top nozzle 30 and the bottom nozzle 40 are to support the upper and lower ends of the guide tubes 20, respectively, wherein the top nozzle 30 may be provided with a pressing device capable of preventing the fuel assembly from being lifted due to water pressure of the coolant flowing upward through a lower part of the nuclear fuel assembly and the bottom nozzle 40 fixes and supports the lower end of the guide tubes 20 and is provided with a plurality of flow path holes to which the cooling water is supplied.

The nuclear fuel assembly is burned up through a nuclear reaction after being loaded in a core of the nuclear reactor, and the spent nuclear fuel is withdrawn from the core by a unit of the nuclear fuel assembly and stored or disposed of through a cooling process.

A lifting operation of the spent nuclear fuel assembly is performed by fixing the lifting device to the top nozzle, and a substantial portion of the total load of the nuclear fuel assembly acts on the guide tubes. On the other hand, when a large load is applied to the guide tubes during a lifting process, the guide tubes being lifted after having been disposed in the core for a long time may break due to defects caused by stress corrosion cracking and the like, thereby causing an accident in which the guide tubes are separated from the top nozzle.

Therefore, it is necessary to supplement the structural integrity of the top nozzle and guide tubes for the safety in handling the spent nuclear fuel assembly.

DISCLOSURE

Technical Problem

Accordingly, the present disclosure has been made keeping in mind the above problems occurring in the related art, and an objective of the present disclosure is to provide a fixing device for use to handle a spent nuclear fuel assembly and a method for installing the same, in which structural reliability of the spent nuclear fuel assembly may be improved by fixing guide tubes and a top nozzle of the spent nuclear fuel assembly to each other. As a result, safety may be increased when the spent nuclear fuel assembly is handled.

Technical Solution

In order to accomplish the above objective, the present disclosure may provide a fixing device for use to handle a spent nuclear fuel assembly, the device fixing guide tubes and a top nozzle by being assembled to the spent nuclear fuel assembly including: a plurality of spacer grids to support a plurality of fuel rods arranged in an axial direction in a transverse direction; a plurality of guide tubes fixed to the spacer grids to form a skeleton of the assembly; and a top nozzle and a bottom nozzle to support upper and lower ends of the guide tubes, respectively, the device further including: a housing provided with a plurality of free end portions elastically deformable in a radial direction by slots formed by dividingly incising a predetermined section of a hollow cylindrical body in a longitudinal direction from a tip end of one side thereof, stopper protrusions protrudingly formed in a radial direction at the tip end of each of the free end portions, a first male thread formed on an outer circumferential surface of a rear end of the cylindrical body, and a female thread formed on an inner circumferential surface of the rear end of the cylindrical body; a rod member having a length longer than the housing, the rod member being provided at a tip end thereof with a pressurization protrusion having an outer diameter larger than an inner diameter of the free end portions, and provided at a rear end thereof with a second male thread screw-assembled with the female thread, thereby being screw-assembled with the housing; and fixing members to fix the housing to the nuclear fuel assembly by being assembled with the first male thread of the housing.

Thickness of the free end portions may be smaller than thickness of the cylindrical body.

An outer diameter of the cylindrical body may be greater than an outer diameter of the free end portions and an outer diameter of the first male thread.

An outer diameter of the pressurization protrusion may be greater than the inner diameter of the free end portions.

The pressurization protrusion may have a hemispherical body in a withdrawal direction and a conical body in an insertion direction.

The housing may further include a first locking head formed of a polygonal or partially chamfered outer circumferential surface extending from the first male screw thread.

The rod member may further include a second locking head formed of a polygonal or partially chamfered outer circumferential surface extending from the second male screw thread.

An outer diameter of the stopper protrusions may be smaller than an inner diameter of the guide tube.

The present disclosure may provide a method for installing a fixing device for use to handle a spent nuclear fuel assembly, the method including: pushing and inserting the housing into the guide tube until the stopper protrusions are elastically engaged with a bulged portion formed in the guide tube to fix the housing with the top nozzle; and rotating the rod member to press-fit the stopper protrusions to the bulged portion by the pressurization protrusion.

Advantageous Effects

A fixing device for use to handle a spent nuclear fuel assembly and a method for installing the same of the present disclosure include: a housing having free end portions elastically deformable in a radial direction by being divided into a plurality of pieces in a longitudinal direction at a tip end of one side thereof; stopper protrusions protrudingly formed in a radial direction at a tip end of each of the free end portions and insertedly fitting with a bulged portion of each guide tube; a rod member provided with a pressurization protrusion and configured to move back and forth by being screw-assembled with the housing, thereby allowing the pressurization protrusion to expand the free end portions in the radial direction; and fixing members to fix the housing to the nuclear fuel assembly by being assembled on an outer circumferential surface of the housing. Accordingly, the fixing device strongly fixes the top nozzle by being fixed to a bulged portion formed in the guide tube of the spent nuclear fuel assembly, thereby increasing the structural reliability. Accordingly, the present disclosure has an effect such that the safety in handling the spent nuclear fuel assembly can be increased.

BEST MODE

Terms or words used in the present specification and claims should not be construed as being limited to conventional or dictionary meanings and should be interpreted as meaning and concept consistent with the technical idea of the present disclosure on the basis of the principle that an inventor may appropriately define the concept of terms in order to describe his/her own invention in the best way.

Therefore, each embodiment described in the present specification and each configuration shown in the drawings are only one of the most exemplary embodiments of the present disclosure and do not represent all technical ideas of the present disclosure, and thus it is to be understood that there may exist a variety of equivalents and variations that may be replaced at the time of application.

Hereinafter, an exemplary embodiment of the present disclosure will be described in detail with reference to the accompanying drawings.

Figure 2:
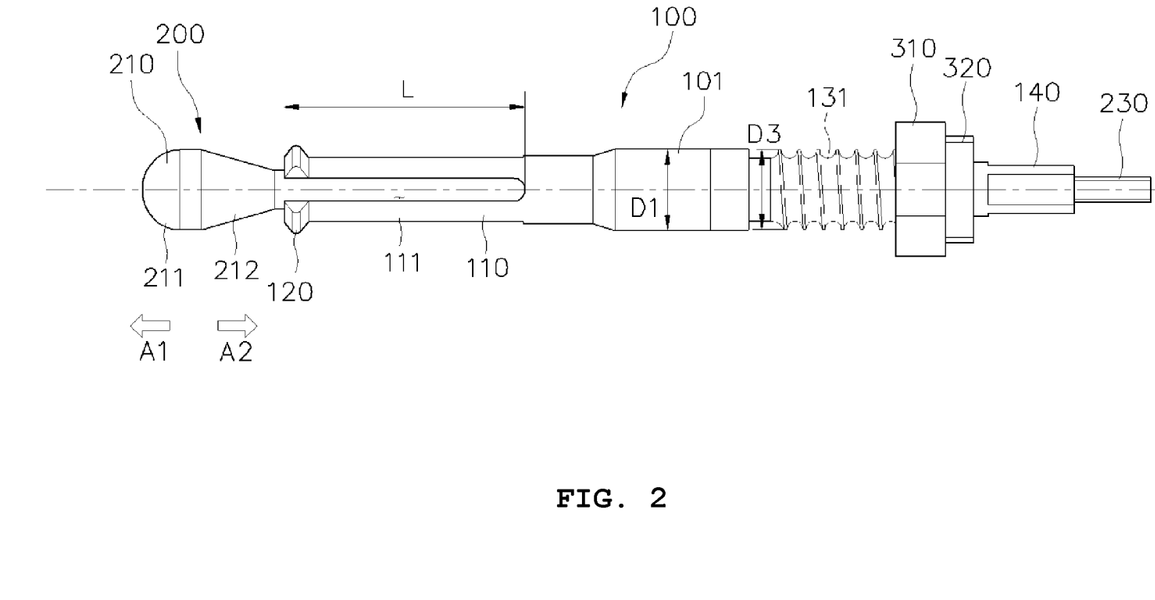
FIG. 2 is a front view of a fixing device for use to handle a spent nuclear fuel assembly according to an embodiment of the present disclosure.
Figure 3:
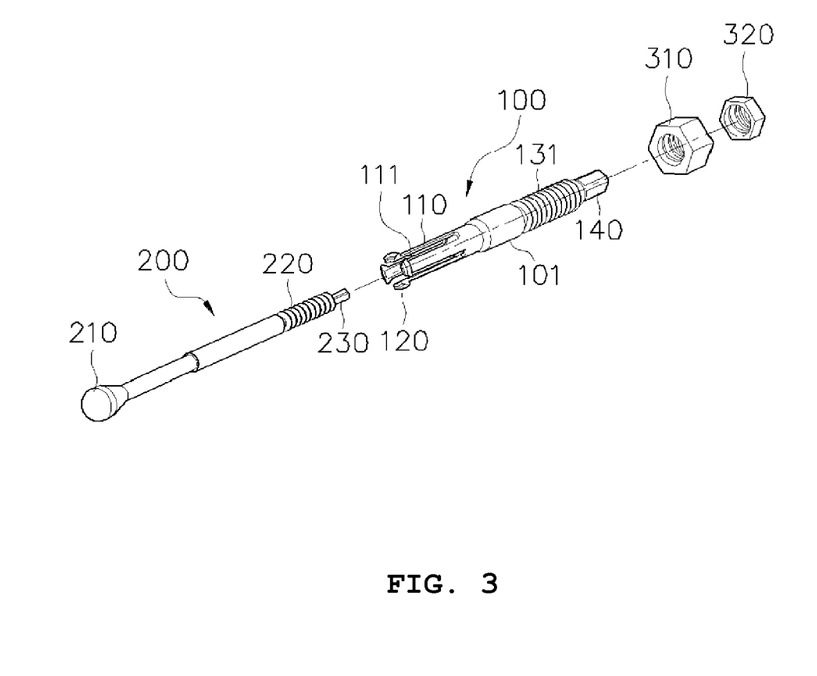
FIG. 3 is an exploded perspective view of the fixing device for use to handle the spent nuclear fuel assembly according to the embodiment of the present disclosure.
Figure 4:
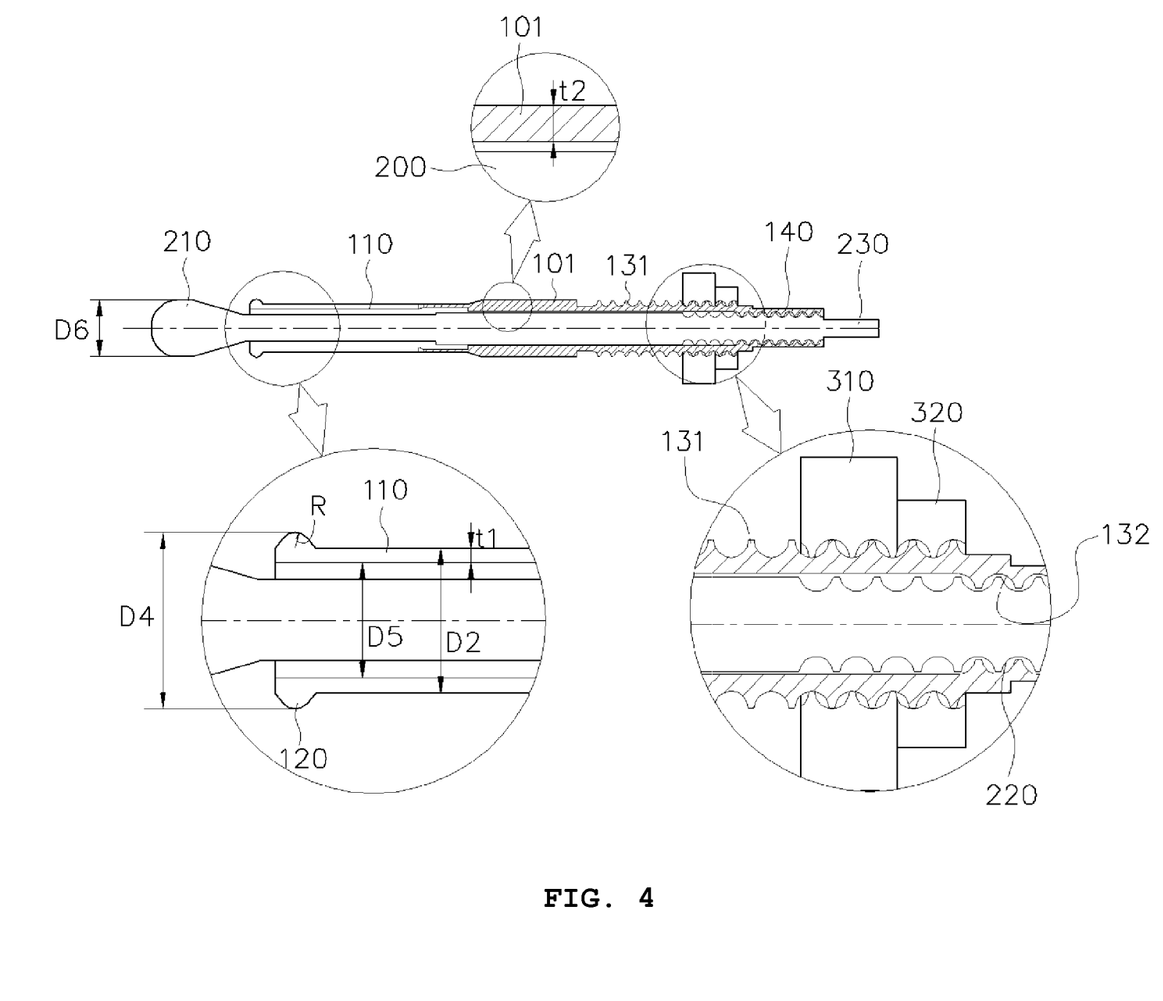
FIG. 4 is a sectional view of the fixing device for use to handle the spent nuclear fuel assembly according to the embodiment of the present disclosure.

FIG. 2 is a front view of a fixing device for use to handle a spent nuclear fuel assembly (hereinafter, abbreviated as "fixing device") according to an embodiment of the present disclosure, FIG. 3 is an exploded perspective view of the fixing device according to the embodiment of the present disclosure, and FIG. 4 is a sectional view of the fixing device according to the embodiment of the present disclosure.

With reference to FIGS. 2 to 4, the fixing device according to the embodiment of the present disclosure includes: a housing 100 having free end portions 110 elastically deformable in a radial direction by being divided into a plurality of pieces by slots 111 formed in a longitudinal direction at a tip end of one side of the hollow cylindrical body 101; a rod member 200 provided with a pressurization protrusion 210 and configured to move back and forth by being screw-assembled with the housing 100, thereby allowing the pressurization protrusion 210 to expand the free end portions 110 in the radial direction; and fixing members 310 and 320 to fix the housing 100 to the nuclear fuel assembly by being assembled on an outer circumferential surface of the housing 100.

The housing 100 includes the hollow cylindrical body 101 and further includes a plurality of the free end portions 110 divided by slots 111 formed by being incised in a predetermined section L in a longitudinal direction at the front end of the cylindrical body 101, a stopper protrusion 120 protrudingly formed in a radial direction at the tip end of each of the free end portions 110, a first male thread 131 formed on an outer circumferential surface of a rear end of the cylindrical body 101, and a female thread 132 formed on an inner circumferential surface of the rear end of the cylindrical body 101.

The cylindrical body 101, the free end portions 110, and the first male thread 131 constituting the external appearance of the housing 100 each have a predetermined outer diameter, and an outer diameter D1 of the cylindrical body 101 is greater than an outer diameter D2 of the free end portions 100 and an outer diameter D3 of the first male thread 131 (D1>D2, D3). Meanwhile, the outer diameter D1 of the cylindrical body 101 is smaller than an inner diameter of a guide tube of the nuclear fuel assembly.

The free end portions 110 are elastically deformable in the radial direction by being divided by the slots 111 being incised in the longitudinal direction. In the present embodiment, the free end portions 110 are shown to be composed of four rotationally symmetrical pieces.

The thickness t1 of the free end portions 110 is smaller than the thickness t2 of the cylindrical body 101 (t2>t1), and thus the plurality of free end portions 110 is elastically deformable in the radial direction by having one end supported by the cylindrical body 101.

A stopper protrusion 120 protruding in the radial direction is provided at a tip end of each of the free end portions 110, and an outer diameter D4 of the stopper protrusions 120 is smaller than the inner diameter of the guide tube. Therefore, in the process the fixing device is inserted into the guide tube, the stopper protrusions 120 are inserted in a state of having a certain frictional force interacted with the inner wall of the guide tube. The stopper protrusion 120 is a curved surface having a point end having a predetermined curvature R, and in particular, the stopper protrusion 120 of such a curved surface is a shape suitable for insertedly fitting with a bulged portion of the guide tube.

The housing 100 may be provided with a first locking head 140 formed of a polygonal or partially chamfered outer circumferential surface extending from the first male screw thread 131 and may be fixed or rotated by fixing a work tool (wrench and the like) on the first locking head 140.

The rod member 200 has a length longer than the housing 100, is provided with a pressurization protrusion 210 having an outer diameter D6, which is larger than an inner diameter D5 of the free end portions 110, at the tip end of one end, and is provided with a second male screw thread 220, which is screw-assembled with the female screw thread 132 of the housing 100, on an outer circumferential surface of the rear end.

The rod member 200 is inserted into the housing 100 to be screw-assembled and moves forward or backward with respect to the housing 100 according to a rotation direction of the rod member 200.

Here, the pressurization protrusion 210 has a hemispherical body 211 in a withdrawal direction A1 and a conical body 212 in an insertion direction A2, with respect to the housing 100.

The rod member 200 may be provided with a second locking head 230 formed of a polygonal or partially chamfered outer circumferential surface at a rear end and may be fixed or rotated by fixing a work tool (wrench and the like) on the second locking head 230. Meanwhile, the rod member 200 has an overall length longer than the housing 100, and thus the second locking head 230 is in a state of being pulled out of the housing 100.

The fixing members 310 and 320 may be provided by nuts that are to be screw-assembled with the first male thread 131 of the housing 100 and may consist of a stopper nut 310 and a locking nut 320. The stopper nut 310 serves to adjust the height of the housing inserted into an inner side of the guide tube, and the locking nut 320, together with the stopper nut 310, is screw-assembled with the first male thread 131 to be in close contact with the stopper nut 310, thereby preventing the stopper nut 310 from loosening.

Figure 5:
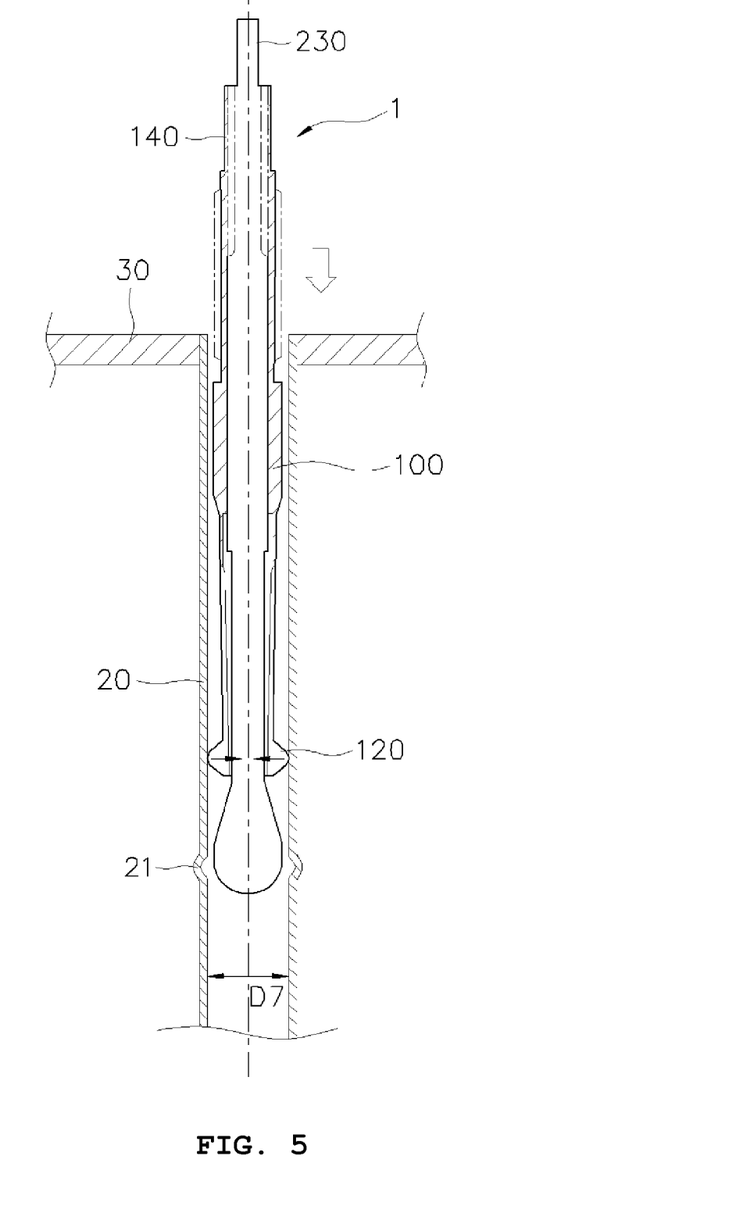
FIGS. 5 to 7 are sectional views showing examples of use of the fixing device for use to handle the spent nuclear fuel assembly according to the embodiment of the present disclosure.
Figure 6:
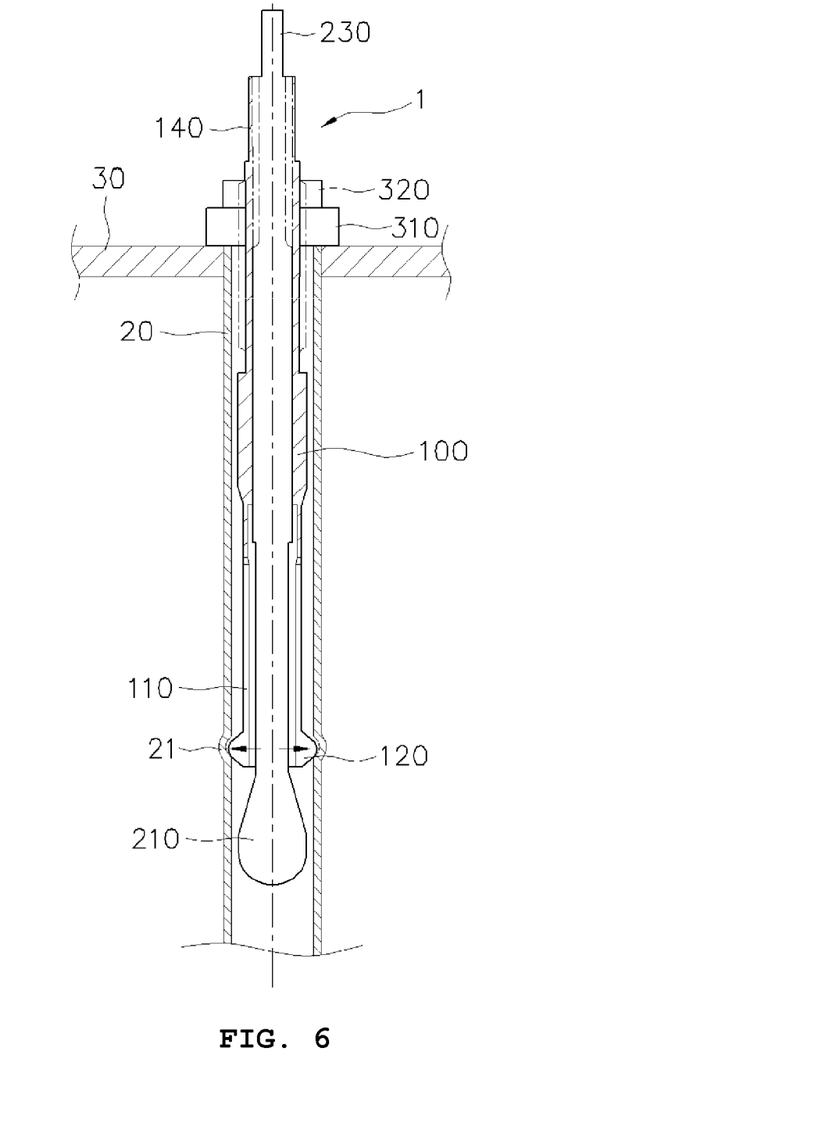
Figure 7:
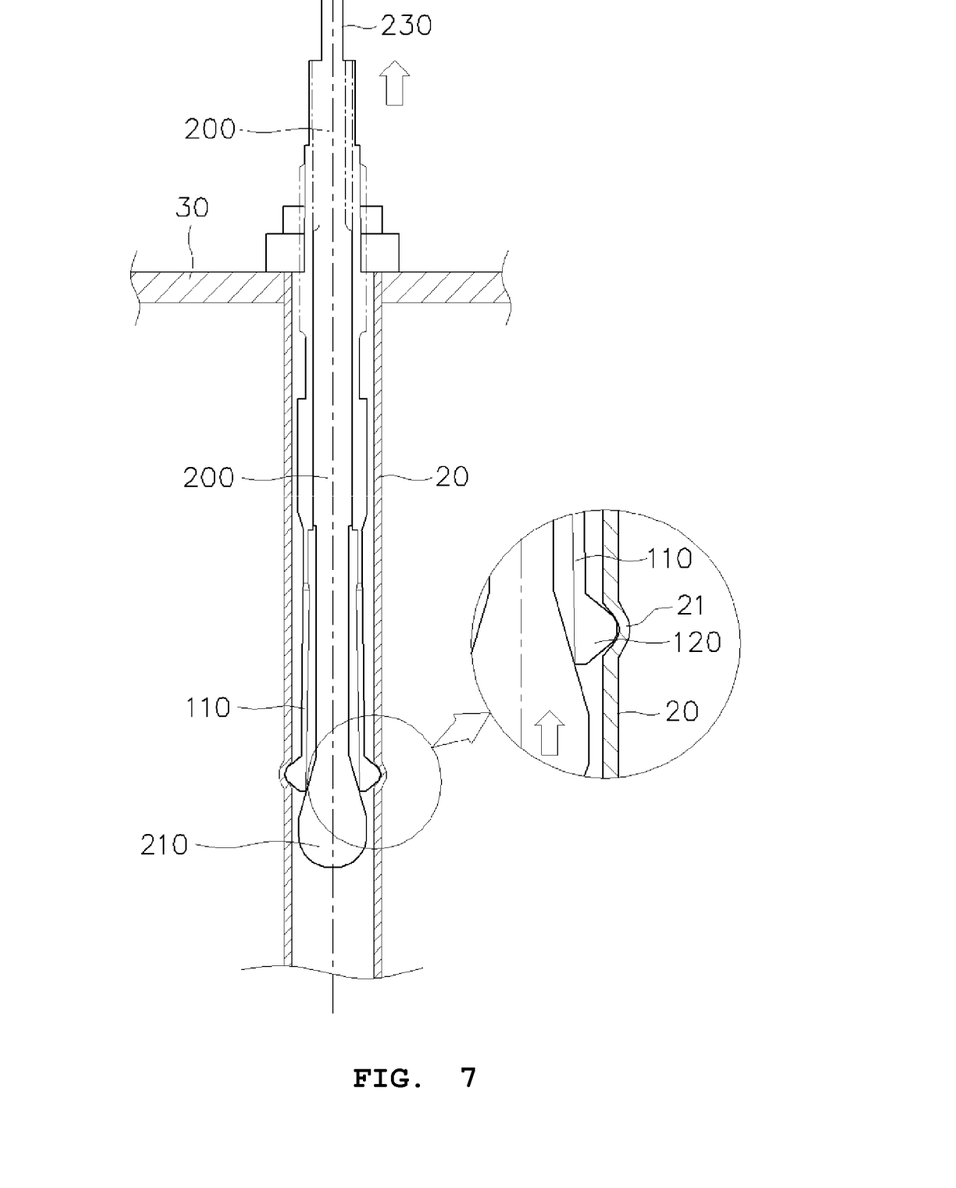

FIGS. 5 to 7 are sectional views showing examples of use of the fixing device for use to handle the spent nuclear fuel assembly according to the embodiment of the present disclosure.

With reference to FIG. 5, the fixing device 1 is pushed in, thereby being inserted into the guide tube. At this time, since a diameter D4 of the stopper protrusions 120 is smaller than an inner diameter D7 of the guide tube 20, the free end portions 110 are elastically deformed in a central axis direction. Accordingly, the insertion of the fixing device 1 is made while a constant frictional force is generated between the stopper protrusions 120 and an inner wall of the guide tube 20.

As illustrated in FIG. 6, the fixing device 1 is inserted until the stopper protrusions 120 are positioned at the bulged portion 21 of the guide tube 20. In this process, the stopper protrusions 120 are inserted into the recess of the bulged portion 21 by the restoring force of the free end portions 110 having compressed elastic force, thereby temporarily fixing the fixing device 1.

Next, the stopper nut 310 is screw-assembled with the housing 100 to assemble the housing 100 with the upper part of the top nozzle 30, and after the assembly of the stopper nut 310 has been completed, the locking nut 320 is tightened, thereby preventing the stopper nut 310 from loosening.

With reference to FIG. 7, when the fixing device 1 is drawn out by rotating the rod member 200 after having been fixed to the top nozzle 30, while the pressurization protrusion 210 rises, the free end portions 110 spread outward. Accordingly, the stopper protrusions 120 are pressed and fixed to the bulged portion 21, whereby the fixing device 1 firmly fixes the guide tube 20 and the top nozzle 30. Meanwhile, the rotation operation of the rod member 200 may be performed by coupling a manual or electric work tool to the second locking head 230.

As described above, although having been described with reference to limited embodiments and drawings, the present disclosure is not limited thereto. Therefore, it is obvious that various modifications and variations are possible within the scope of the technical spirit of the present disclosure and the claims to be described below by those of ordinary skill in the art to which the present disclosure pertains.

The invention claimed is:

1. A device for supplementing structural integrity of a spent nuclear fuel assembly during handling, wherein the spent nuclear fuel assembly comprises:
   a plurality of spacer grids to support a plurality of fuel rods arranged in an axial direction in a transverse direction;
   a plurality of guide tubes fixed to the spacer grids to form a skeleton of the assembly, each of the plurality of guide tubes including a bulged portion; and
   a top nozzle and a bottom nozzle to support upper and lower ends of the guide tubes, respectively;
   wherein the device comprises:
   a housing provided with a plurality of free end portions elastically deformable in a radial direction, the plurality of free end portions defined by a predetermined section of a hollow cylindrical body divided by slots formed in a longitudinal direction from a tip end of one side thereof, the housing further including stopper protrusions protrudingly formed in a radial direction at the tip end of each of the free end portions configured for insertion into the bulged portion of the guide tube, a first male thread formed on an outer circumferential surface of a rear end of the cylindrical body, and a female thread formed on an inner circumferential surface of the rear end of the cylindrical body;
   a rod member having a length longer than the housing, the rod member being provided at a tip end thereof with a pressurization protrusion having an outer diameter larger than an inner diameter of the free end portions, and provided at a rear end thereof with a second male thread configured to engage with the female thread of the housing when the rod member is assembled with the housing; and
   fixing members configured to engage with the first male thread of the housing to secure the housing and the rod member to the top nozzle of the spent nuclear fuel assembly after the device is inserted into guide tube.

2. The device of claim 1, wherein thickness of the free end portions is smaller than thickness of the cylindrical body.

3. The device of claim 1, wherein an outer diameter of the cylindrical body is greater than an outer diameter of the free end portions and an outer diameter of the first male thread.

4. The device of claim 1, wherein the pressurization protrusion has a hemispherical body in a withdrawal direction and a conical body in an insertion direction.

5. The device of claim 1, wherein the housing further comprises a locking head formed of a polygonal or partially chamfered outer circumferential surface extending from the first male thread.

6. The device of claim 1, wherein the rod member further comprises a locking head formed of a polygonal or partially chamfered outer circumferential surface extending from the second male thread.

7. The device of claim 1, wherein an outer diameter of the stopper protrusions is smaller than an inner diameter of the guide tube.

8. A method for installing the device of claim 1 to the spent nuclear fuel assembly, the method comprising:
- pushing and inserting the housing assembled with the rod member into the guide tube until the stopper protrusions are elastically engaged with the bulged portion formed in the guide tube;
- securing the housing and the rod member to the top nozzle of the spent nuclear fuel assembly by threadly engaging the fixing members with the first male thread of the housing; and
- rotating the rod member, to press-fit the stopper protrusions to the bulged portion by the pressurization protrusion.

* * * * *